United States Patent
Lee et al.

(10) Patent No.: US 8,027,125 B2
(45) Date of Patent: Sep. 27, 2011

(54) PMR WITH IMPROVED WRITABILITY AND PROCESS CONTROLLABILITY BY DOUBLE LAYER PATTERNING

(75) Inventors: Jiun-Ting Lee, Santa Clara, CA (US); Shiwen Huang, Fremont, CA (US); Moris Dovek, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 1132 days.

(21) Appl. No.: 11/820,962

(22) Filed: Jun. 21, 2007

(65) Prior Publication Data
US 2008/0316644 A1     Dec. 25, 2008

(51) Int. Cl.
G11B 5/127     (2006.01)
(52) U.S. Cl. .................. 360/125.03; 29/603.18
(58) Field of Classification Search ........... 360/125.03
See application file for complete search history.

(56) References Cited

U.S. PATENT DOCUMENTS

| | | | |
|---|---|---|---|
| 7,190,553 B2 | 3/2007 | Morita et al. | |
| 2001/0028531 A1 | 10/2001 | Morita et al. | |
| 2006/0002021 A1 | 1/2006 | Li et al. | |
| 2006/0077590 A1 | 4/2006 | Sasaki et al. | |
| 2006/0225268 A1* | 10/2006 | Le et al. | 29/603.14 |
| 2006/0276039 A1 | 12/2006 | Li et al. | |
| 2007/0014048 A1 | 1/2007 | Sasaki et al. | |

OTHER PUBLICATIONS

Co-pending US Patent HT06-054, U.S. Appl. No. 11/727,371, Filed Mar. 26, 2007, "Magnetic Head for Perpendicular Magnetic Recording and Method of Manufacturing Same,".

* cited by examiner

*Primary Examiner* — David D Davis
(74) *Attorney, Agent, or Firm* — Saile Ackerman LLC; Stephen B. Ackerman

(57) ABSTRACT

Improved writability and a sharper neck transition are achieved in a PMR writer with a yoke that has essentially vertical sidewalls and a write pole that has sidewalls with a beveled angle. An alumina mold is made with a negative differential bevel angle by employing a two mask process. A first photoresist layer is patterned and etched to form a rectangular trench in an alumina layer. The trench extends beyond the intended ABS plane and in the opposite direction into the intended yoke area. A second photoresist layer is patterned into a yoke shape that is partially superimposed over the rectangular trench. After a second RIE process, the yoke opening adjoins the trench at a neck transition point along each long trench side. The volume of magnetic material in the yoke adjacent to the neck is thereby maximized. Dimension control of the main pole becomes independent of ABS positioning errors.

15 Claims, 6 Drawing Sheets

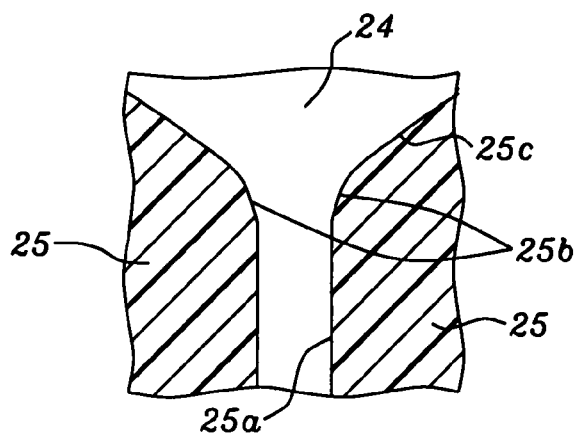
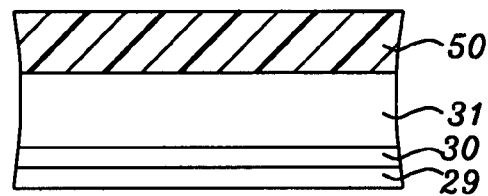
FIG. 5
(Prior Art)
FIG. 6
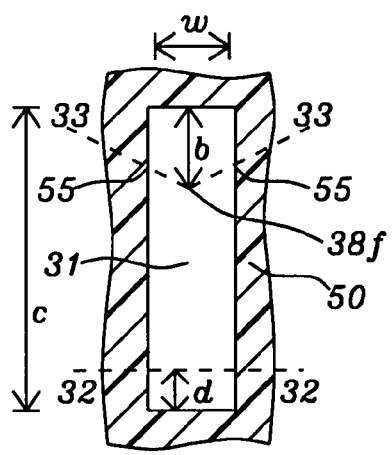
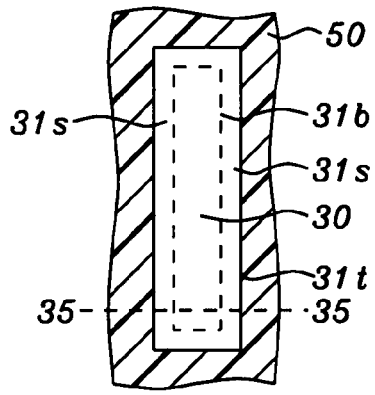
FIG. 7
FIG. 8a

PMR WITH IMPROVED WRITABILITY AND PROCESS CONTROLLABILITY BY DOUBLE LAYER PATTERNING

RELATED PATENT APPLICATION

This application is related to U.S. Patent Application Publication No. 2007/0014048, assigned to the same assignee as the current invention and which is herein incorporated by reference in its entirety.

FIELD OF THE INVENTION

The invention relates to a PMR writer and a method for making the same wherein the PMR writer has a main pole layer with a yoke portion having an essentially vertical sidewall, and a write pole portion with a beveled sidewall to improve writability and neck height control.

BACKGROUND OF THE INVENTION

Perpendicular magnetic recording (PMR) has been developed in part to achieve higher recording density than is realized with longitudinal magnetic recording (LMR) devices and is believed to be the successor of LMR for next generation magnetic data storage products and beyond. A single pole writer combined with a soft magnetic underlayer has the intrinsic advantage of delivering higher write field than LMR heads. A conventional PMR write head as depicted in FIG. 1 typically has a main pole layer 10 or write pole with a write pole tip 10t at an air bearing surface (ABS) 5 and a flux return pole (opposing pole) 8 which is magnetically coupled to the write pole through a trailing shield 7. Magnetic flux in the write pole layer 10 is generated by coils 6 and passes through the pole tip into a magnetic recording media 4 and then back to the write head by entering the flux return pole 8. The write pole concentrates magnetic flux so that the magnetic field at the write pole tip 10t at the ABS is high enough to switch magnetizations in the recording media 4. A trailing shield is added to improve the field gradient in the down-track direction.

Referring to FIG. 2, a top view is shown of a typical main pole layer 10 that has a large, wide portion called a yoke 10m and a narrow rectangular portion 10p called a write pole that extends a neck height (NH) distance y from the ABS plane 5-5 to a plane 3-3 parallel to the ABS where the write pole intersects the yoke at the neck 12. The main pole layer 10 flares outward at an angle θ from a dashed line 11 that is an extension of one of the long rectangular sides of the pole 10p. PMR technologies require the write pole 10p at the ABS to have a beveled shape so that the skew related writing errors can be suppressed. Note that the top surface of the main pole layer 10 has sides 10t while the bottom surface has sides 10b. In other words, the top surface outlined by sides 10t has a larger surface area than the bottom surface outlined by sides 10b and from a top-down view, the sides 10t do not overlap the sides 10b.

In the fabrication process, the yoke 10m and write pole 10p may be formed by patterning a photoresist layer (not shown) above an alumina layer and then transferring the pattern through the alumina by an etching process to form a mold. An electroplating method is used to deposit a main pole layer 10 that fills the cavity in the alumina. Finally, a lapping process is employed to remove the end of the write pole 10p opposite the yoke 10m and thereby define an ABS plane 5-5.

To achieve high areal recording density with PMR technology, key requirements for the PMR writer design are to provide large field magnitude and high field gradient in both down-track and cross-track directions. In practice, these two requirements are often traded off with each other to balance the overall performance. One approach involves optimizing the geometry of the main pole layer such as modifying the values for NH and flare angle θ. A short NH or large θ can increase write field magnitude effectively. However, too short of a NH leads to problems of meeting process tolerance during manufacturing while too large of a flare angle θ may cause a large amount of adjacent track erasure because of a large fringe field. In today's commercial PMR writer products, NH is generally greater than 0.1 micron and flare angle θ is kept less than 45 degrees.

In order to pattern the beveled main pole (MP) comprising yoke 10m and write pole 10p, several different techniques have been adopted by the thin film head industry and include high tilt ion milling and electroplating over a photoresist with beveled sidewall or beveled alumina mold etched by a reactive ion etch (RIE). The write pole 10p is where a beveled sidewall is required for optimum performance while the yoke 10m does not need a beveled sidewall. However, during MP fabrication, the write pole and yoke are subjected to the same process conditions and as a result, the side wall at the write pole 10p and the sidewall at the yoke 10m both have a bevel angle (BA).

Referring to FIG. 3, a three dimensional view of the main pole layer 10 from FIG. 2 is illustrated from an oblique angle in order to show the bevel angle α which is typically from 5° to 12° and around the perimeter of the yoke 10m and write pole 10p and at the neck 12. The main pole layer has sides or sloping sidewalls 10s with a sidewall top 10t and a sidewall bottom 10b and the write pole tip 10r is formed at the ABS. Note that the amount of overhang g of a sidewall top 10t over a sidewall bottom 10b is equal to the bevel angle α×the main pole layer 10 (or alumina layer) thickness f. This beveled design invariably reduces the volume of magnetic material behind the ABS and especially in the yoke 10m adjacent to the neck 12 where a beveled sidewall is not necessary. As a result, the writability of the main pole layer 10 is significantly reduced since the volume of magnetic material is most critical near the neck 12.

Referring to FIG. 4, a top-down view of an alumina layer 21 with sidewalls 21s is shown after a typical photoresist patterning and RIE process that uncovers substrate 20 and prior to electroplating the main pole layer. Note that the sidewall tops 21t begin to flare outward (away from a vertical axis) near the plane 22-22 while the sidewall bottoms 21b begin to flare outward at the plane 23-23. Ideally, sidewall tops 21t and sidewall bottoms 21b should both diverge from a vertical axis near plane 23-23. Due to the nature of the RIE process, the bevel angle is smaller (steeper sidewall 21s) at the narrow region 20n where the write pole 10p will subsequently be formed, and is larger (shallower sidewall 21s) adjacent to the open region 20 where the yoke 10m will later be placed. Thus, from a top-down view, the sidewall 21s is wider near the large opening 20 and narrower adjacent to the narrow opening 20n. This problem is called positive dBA (differential bevel angle) which means the yoke 10m (FIG. 3) will be undercut to a more tapered angle α than the write pole 10p. As a result, there is a significant reduction in the volume of magnetic materials that are plated in the yoke 10m adjacent to the neck 12 compared with the desired situation where the sidewalls 10s in the yoke 10m are vertical. Accordingly, there is a need to implement a main pole layer fabrication process that will enable the sidewalls in the yoke to be essentially vertical near the neck transition point where write pole 10p adjoins yoke 10m and thereby increase main pole layer writability.

Another challenge for the PMR fabrication process is to make the neck transition as sharp as possible. In FIG. 5, a typical top view of a photoresist layer 25 that has been patterned in the shape of a main pole layer on a substrate 24 is shown. Due to an optical proximity effect, the neck corner 25b is rounded even though the mask design has sharp angles for the juncture of the side 25a and side 25c at the neck. The corner rounding problem is well known in photolithography. A common technique called OPC (optical proximity correction) involving addition of sub-resolution features (hammer heads or serifs) near the corners of features on the photomask is often used to reduce corner rounding. However, the neck transition will never be perfectly sharp since the sharpness (resolution) of the corner is dependent on exposure λ and the wavelength of advanced lithography tools is currently limited to 193 nm (ArF excimer laser).

Corner rounding in the neck region continues to impose serious problems for main pole dimensional control. For example, the NH design distance y (FIG. 2) between the ABS plane 5-5 and plane 3-3 at neck 12 is ever decreasing for higher areal density designs. A rounded corner at neck 12 effectively moves the plane 3-3 closer to the ABS and allows less room for ABS placement error. If the ABS is formed at an angle to the plane 3-3 rather than in a parallel arrangement, then the ABS may easily cut into a rounded corner near neck 12 and effect neck height distance y. In other words, any ABS position errors induced by the slider process will be translated into additional dimension errors for y.

A search of the prior art revealed the following references. In U.S. Patent Application Publication No. 2001/0028531 and in related U.S. Pat. No. 7,190,553, a magnetic pole layer is shown with write pole, yoke, and neck portions having inclined sidewalls that are sloping inward.

U.S. Patent Application Publication No. 2007/0014048 teaches a two step etching sequence involving a first slit pattern and a second slit pattern to form an alumina mold so that a subsequently deposited main magnetic pole layer has enhanced volume whereby the overwrite characteristic can be improved.

In U.S. Patent Application Publication No. 2006/0002021, a process is provided for forming a main pole layer wherein a bottom yoke portion and a write pole are deposited first and then a top yoke portion is formed on the bottom yoke portion.

U.S. Patent Application Publication No. 2006/0077590 discloses a method of forming a main pole layer wherein a pole encasing layer is formed on a substrate that can serve as an electrode for a plating operation. A groove is etched in the pole encasing layer by means of a $BCl_3$, $Cl_2$, and $CF_4$ gas mixture to produce a bevel angle between 5 and 12 degrees.

In U.S. Patent Application Publication No. 2006/0276039, an improved mold for forming a PMR write head is fabricated by forming a Ta layer in the intended yoke region and then depositing alumina on the substrate. After polishing, the alumina layer is coplanar with the Ta layer. During the etching process to form a mold opening, sloping sidewalls are formed in the pole region of the opening in the alumina layer and vertical sidewalls are formed in the yoke region of the opening in the Ta layer.

SUMMARY OF THE INVENTION

One objective of the present invention is to provide a main pole layer fabrication process wherein an alumina mold shape is formed that allows essentially vertical sidewalls to be achieved on the resulting yoke portion of the main pole layer near the neck transition point.

Another objective of the present invention is to increase writability of the main pole layer by minimizing the neck transition length between a write pole portion and a yoke portion to near zero and thereby increase dimension control during main pole layer fabrication.

These objectives are realized in the present invention through an improved main pole layer fabrication process for a PMR writer that separates the formation of the write pole shape from formation of the yoke shape in a mold layer comprised of an insulation material. In a first step, a RIE resistant layer such as Ru is deposited on a substrate. The RIE resistant layer will provide high etch selectivity relative to an overlying insulation layer in a subsequent RIE step. Next, an insulation layer with the desired main pole (MP) layer thickness is deposited on the RIE resistant layer. A first photoresist layer is coated on the insulation layer and patterned to form a rectangular shape (trench) having a width that is based on the MP design width for the pole portion to be subsequently formed. The length of the rectangle must extend in one direction beyond the location for the ABS position and in the opposite direction into the intended yoke position. Since the length of the rectangle is between 0.4 and 20 microns, the shape can be treated as a nearly infinitely long strip that allows simple photolithographic techniques to improve image contrast and control of the resulting shape. The remaining photoresist layer serves as an etch mask during an RIE step that transfers the rectangular shape through the insulation layer and stops on the RIE resistant layer. The RIE is performed with the appropriate mix of chlorine, $BCl_3$, and fluorocarbon gases to form a predetermined beveled angle (BA) on the insulation layer sidewalls thereby forming a trench. In other words, the opening at the bottom of the trench is smaller than the opening at the top of the trench. The first photoresist layer is stripped to leave a patterned insulation layer having sidewalls with a certain width from a top view which is perpendicular to the substrate. The certain width is determined by the BA and insulation layer thickness.

A second photoresist layer is coated on the patterned insulation layer and is patternwise exposed through a second mask (reticle). After image development, the second photoresist layer has a yoke shape opening that is partially overlaid on the rectangular trench in the insulation layer. In one embodiment, the yoke is a five sided shape wherein two parallel sides that are perpendicular to the ABS are connected at an end opposite the ABS by a third side representing the back end of the yoke. Fourth and fifth sides extend from the ends of the first and second sides, respectively, nearest the ABS and converge at a point above the trench proximate to the neck where the yoke shape intersects the trench. Thus, a portion of the rectangular trench and a portion of the insulation layer are uncovered between the third side and the point where the fourth and fifth sides converge above the trench while the remainder of the trench remains covered by the second photoresist layer. A second RIE process is performed where the yoke shape is transferred through the exposed region of insulation layer and stops on the RIE resistant layer. As a result, the insulation layer surrounding the uncovered portion of trench is removed and becomes part of the yoke opening. A different etch chemistry is selected for the second RIE step and may include the proper mix of $BCl_3$ and chlorine so that an essentially vertical insulation layer sidewall is formed in the yoke opening. Although a small section of the RIE resistant layer will be subjected to two RIE steps, the RIE resistant material has a high enough selectivity relative to the insulation layer so that the exposed surface of the RIE resistant layer is essentially planar.

Thereafter, the second photoresist layer is removed to leave a yoke opening with an essentially vertical sidewall and a pole opening with a beveled sidewall in the insulation layer. The two openings adjoin each other at two neck transition points. The openings may be filled to form a main pole layer by a well known sequence that comprises depositing a seed layer on the RIE resistant layer within the yoke opening and write pole opening, and then electroplating a magnetic material that fills the openings. The resulting main pole layer has a write pole with a beveled angle sidewall and a yoke with an essentially vertical sidewall.

BRIEF DESCRIPTION OF THE DRAWINGS

FIG. 5 is a top view of a photoresist layer that has been patterned and shows the curvature in a portion of the yoke and write pole openings near the neck transition point.

FIG. 6 is a cross-sectional view of a RIE resistant layer, insulation layer, and photoresist layer that have been sequentially formed on a substrate according to a method of the present invention.

FIG. 7 is a top view of the photoresist layer in FIG. 6 that has been patterned to form a write pole portion of a main pole layer according to a method of the present invention.

FIG. 8a is a top view of the photoresist layer in FIG. 7 after a RIE process is employed to transfer the pattern into an underlying insulation layer and form sloped sidewalls according to an embodiment of the present invention.

DETAILED DESCRIPTION OF THE INVENTION

Figure 1:
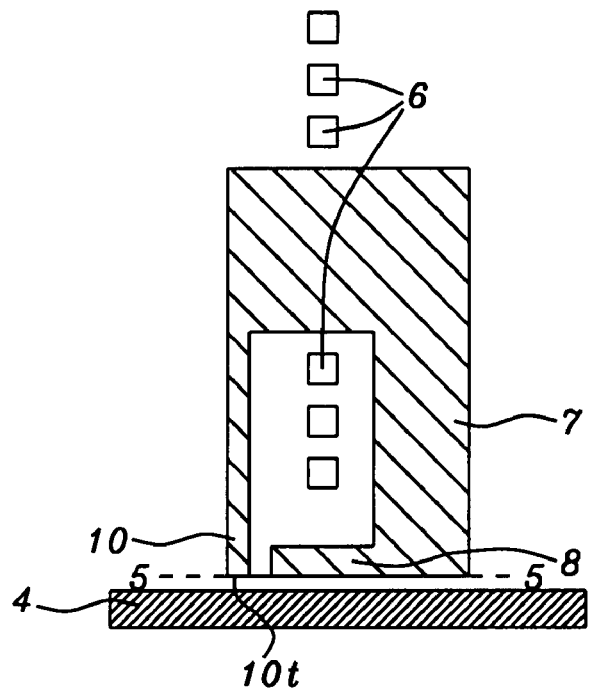
FIG. 1 is a cross-sectional view of a conventional PMR writer showing the main write pole, flux return pole, magnetic recording media, and coils that generate magnetic flux.
Figure 2:
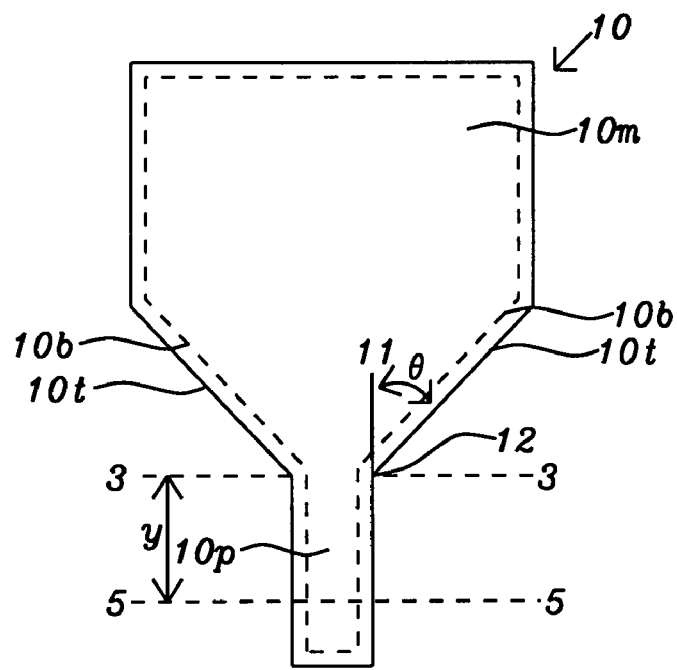
FIG. 2 is a top view showing a main pole layer of a conventional PMR write head that has a narrow write pole section adjacent to the ABS and a larger yoke section with sides that flare outward at an angle θ from the sides of the narrow write pole.
Figure 3:
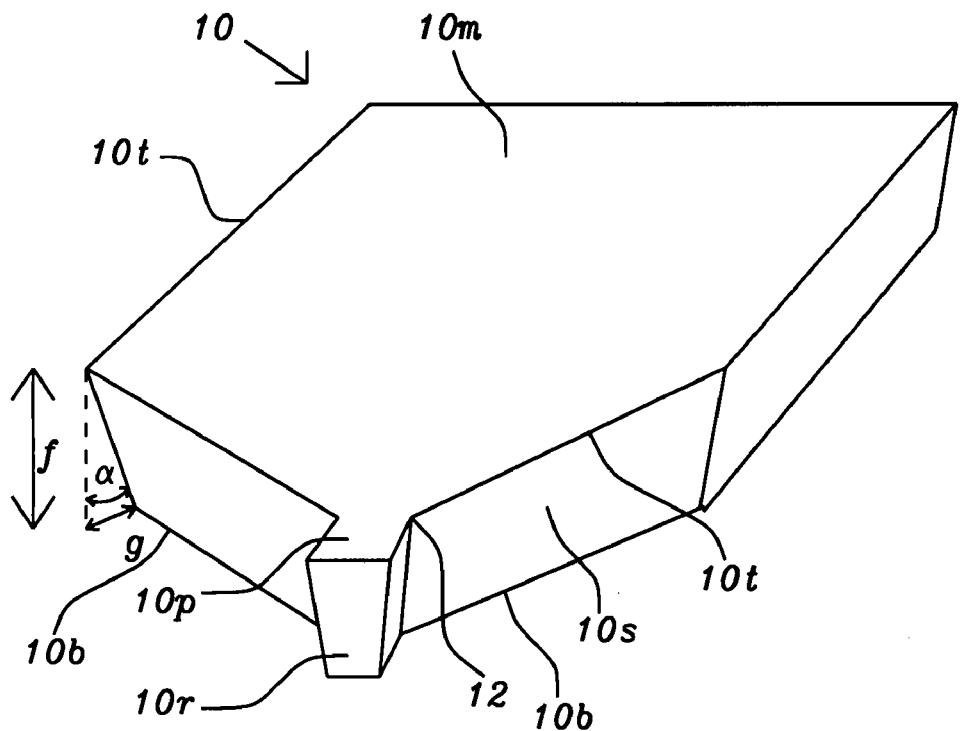
FIG. 3 is an oblique view of the main write pole layer in FIG. 2 that shows both the yoke and write pole having an undercut profile and sidewalls with a beveled angle.

The present invention is a main pole layer for a PMR writer having a write pole section with a beveled sidewall and a yoke section that has an essentially vertical sidewall to maximize the volume of magnetic material in the yoke adjacent to the neck transition point. Although the yoke in the exemplary embodiment is depicted as a five sided structure from a top view, the present invention encompasses other yoke shapes that include polygonal sides and a continuously curved side, for example. It should be understood that the elements in the drawings are not necessarily drawn to scale.

Figure 11:
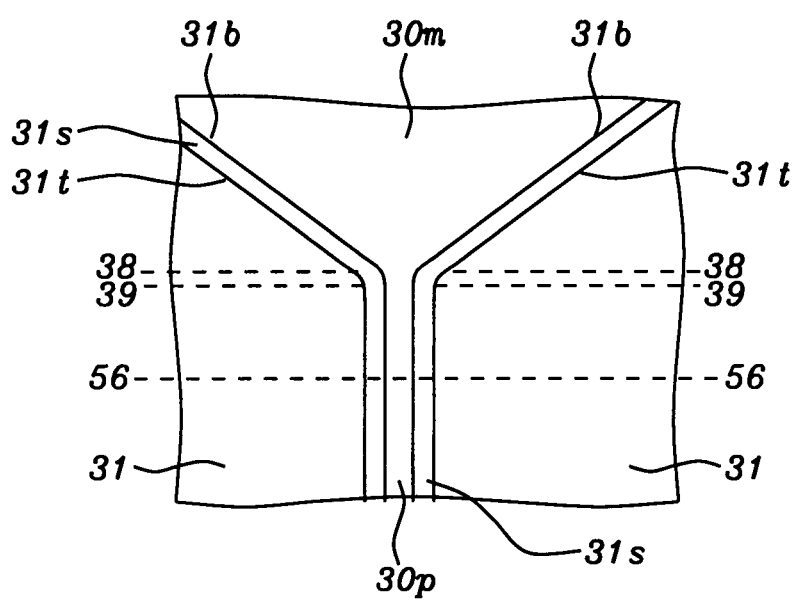
FIG. 11 is a top view of a mold that has been formed by a two mask method to minimize differential bevel angle (dBA) and shows that the width of insulation layer sidewalls in the yoke shape and in the narrow write pole opening are essentially equal.

Referring to FIG. 11, the inventors currently practice a main pole layer fabrication technique as described in U.S. Patent Application Publication No. 2007/0014048 that involves two patterning steps to suppress the positive dBA issue described earlier which is characteristic of conventional mold shapes. A first photoresist layer is patterned to form a "Y" shape that defines the write pole opening at the bottom of a "Y" shape and two thin slits representing a portion of the yoke opening at the top of the "Y" shape. The pattern is then etched into an underlying insulation layer where each of the two slits at the top of the "Y" shape has an outer sidewall and an inner sidewall. Since the line width in the two slits that form the top of the "Y" shape is close to that of the write pole at the base of the "Y" shape, the bevel angle in the sidewall of the write pole shape is close to the bevel angle in the sidewall of the yoke slits after the first etch step. After the first photoresist layer is removed, a second photoresist layer is coated on the alumina layer and is patterned to form a large yoke opening that includes the region between the two narrow slits at the top of the "Y" shape. A second etch step transfers the yoke opening in the insulation layer and preserves the "outside" sidewalls in the two slits. The "inside" sidewalls are removed during the second etch since that portion of the first pattern is overlapped by the opening in the second pattern. Through this "two mask" technique, the dBA of the RIE process is substantially reduced and is very close to other process methods such as ion milling and electroplating over a beveled photoresist pattern. An alumina mold formed by this method is shown in FIG. 11 and will be described with more detail in a later section. Since a beveled angle in the yoke sidewalls still exists, there is room for further improvement in maximizing the volume of magnetic material in the yoke adjacent to the neck transition point by minimizing the bevel angle in the yoke to near zero.

According to the present invention, a method is disclosed for generating a negative value for the dBA so that the sidewalls on the yoke are steeper than the sidewalls on the write pole section of the main pole layer. The method involves a two mask process but separates the formation of the write pole opening from the formation of the yoke opening in the insulation layer.

Referring to FIG. 6, a substrate 29 is provided that may be comprised of AlTiC, for example. A RIE resistant layer 30 with a thickness of 200 to 2000 Angstroms is formed on the substrate 29 by a sputter deposition or physical vapor deposition (PVD) process, for example, and preferably includes a material such as Ru, NiCr, or NiPd that has a high selectivity relative to an insulating material such as alumina during a subsequent RIE etch that uses $BCl_3$, chlorine, and fluorocarbon gases. The RIE resistant layer 30 may also serve as an electrode for a subsequent electroplating operation in which a seed layer and main pole layer are deposited on a portion of the RIE resistant layer. Above the RIE resistant layer 30 is an insulation layer 31 wherein a mold shape will subsequently be formed for depositing a main pole layer. The insulation layer 31 may be comprised of $Al_2O_3$ or silicon oxide that may be deposited by a PVD or sputtering technique in the same deposition tool as the RIE resistant layer. The insulation layer 31 may also be made of other dielectric materials known in the art and has a thickness equivalent to the desired thickness of the main pole layer to be deposited in a later step. A first photoresist layer 50 is then coated on the insulation layer 31 by a conventional process.

Referring to FIG. 7, the first photoresist layer 50 is patterned to form a rectangular opening that uncovers a portion of the insulation layer 31. The opening has a length c of about 0.4 to 20 microns and a width w where w corresponds to the track width of the write pole section in the main pole layer. Plane 32-32 indicates where a lapping process will form an ABS plane following formation of the main pole layer. Note that the opening in photoresist layer 50 should extend a distance d of 0.2 to 10 microns below the intended ABS plane 32-32. Furthermore, the opening should extend a distance b of about 0.2 to 10 microns above the convergence point 38*f* where the two lower sides 33 of the intended yoke are designed to meet. Note that the intended yoke shape may have a plurality of sides but only the two sides that define the portion of the yoke adjacent to the pole are shown and converge at point 38*f*. In an embodiment where the yoke has a continuous curved shape, the two sections 33 of the continuous shape that define the front end of the yoke adjacent to the pole converge at point 38*f*. The two intersection points where the two lower sides (sections) 33 meet the edge of the opening in first photoresist layer 50 are defined as the neck transition points 55. The point of convergence 38*f* is between the neck transition points 55 and the ABS plane 32-32. The distance between the intended ABS plane 32-32 and neck transition points 55 represents a neck height (NH) that may be as small as 0.04 microns. With a length c, the rectangular opening can be treated as a near infinitely long strip that allows simpler photolithography methods than optical proximity corrections to improve image contrast and reduce corner rounding.

Referring to FIG. 8*a*, the opening in the first photoresist layer 50 is transferred into the underlying insulation layer 31 by a RIE process. The etch chemistry for the RIE process may include $BCl_3$, $Cl_2$, and one or more fluorocarbon gases that are mixed in an appropriate ratio to generate a slope in the insulation layer sidewalls 31*s* that will determine the ultimate bevel angle (BA) in the write pole section of the main pole layer. In one embodiment, the RIE conditions comprise a RF power of 10 to 200 Watts, a 0.01 to 0.2 standard liter per minute (slm) $BCl_3$ flow rate, a 0.01 to 0.2 slm $Cl_2$ flow rate, and a 0.01 to 0.2 slm $CF_4$ flow rate at a temperature of about 20° C. to 90° C. A reduction in the fluorocarbon flow rate may be used to form a smaller bevel angle and increase the slope of sidewalls 31*s*. From a top view, the top 31*t* of the sidewalls 31*s* do not overlap the bottom 31*b* of the sidewalls. In other words, the area of the RIE resistant layer 30 uncovered by the first etch step is less than the area of the opening in the photoresist layer 50.

Figure 8B:
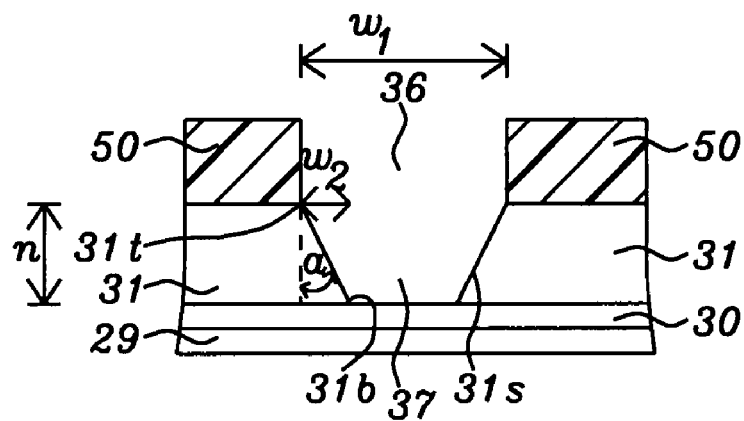
FIG. 8b is a cross-sectional view of the rectangular opening in FIG. 8a and shows the RIE process stops on a RIE resistant layer.

Referring to FIG. 8*b*, a cross-sectional view of the etched pattern in insulation layer 31 is shown as seen from the plane 35-35 in FIG. 8*a*. It should be understood by those skilled in the art that there may be some etch bias during the first etch step such that the width $w_1$ of opening 36 in the first photoresist layer 50 is slightly larger or smaller than the width w in the opening (FIG. 7) after the initial patterning step. The width $w_2$ of a sidewall 31*s* is proportional to the thickness n of insulation layer 31 times the bevel angle α. Preferably, the bevel angle α is in the range of about 5° to 20°. Below the opening 36 is a trench 37 in the insulation layer 31. After the first etch process is complete, the first photoresist layer 50 is stripped by a conventional method.

Figure 9:
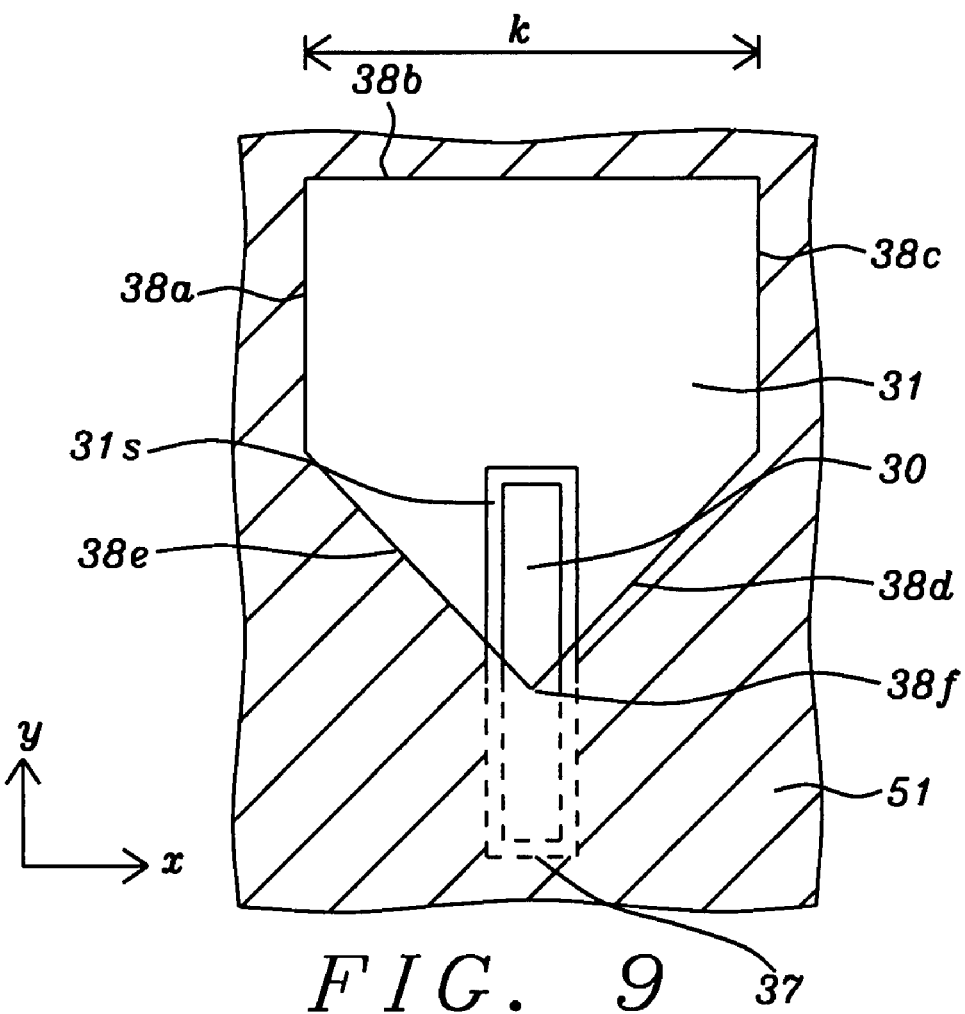
FIG. 9 is a top view of a second photoresist layer which has been coated on the insulation layer and patterned to form a yoke opening that partially overlays the trench opening in the insulation layer according to an embodiment of the present invention.

Referring to FIG. 9, a second photoresist layer 51 is coated on the patterned insulation layer 31 that has a rectangular trench 37. The pattern in the second photoresist layer 51 has a yoke shape that is partially superimposed over the trench in the insulation layer 31. In particular, the section of the trench 37 that will be filled to form a write pole in main pole layer is covered by the second photoresist layer 51 as a protective measure during a second RIE process in a subsequent step. In the exemplary embodiment, the yoke shape has five sides shown as 38*a*-38*e*. However, as mentioned previously, the present invention encompasses other yoke shapes including polygonal shapes and a shape with a continuous curved edge as appreciated by those skilled in the art.

With respect to FIG. 9, a first side 38*a* and a third side 38*c* are formed in a y-axis direction and are essentially parallel to the long sides of the rectangular trench 37 and perpendicular to the ABS. The distance k between the two sides 38*a* and 38*c* may be from 5 to 50 microns. A second side 38*b* is formed in an x-axis direction and connects the two sides 38*a*, 38*c* at ends opposite the ABS. Second side 38*b* is located at a position that represents where the back end of the yoke (farthest from the ABS) will be formed. A fourth side 38*d* extends from a second end of side 38*c* (opposite side 38*b*) while a fifth side 38*e* extends from a second end of side 38*a* (opposite side 38*b*). Fourth and fifth sides 38*d*, 38*e* converge and end at a point 38*f* located over the trench 37 and preferably above the RIE resistant layer 30 between the trench sidewalls and near the intended neck transition points in the main pole layer where the yoke joins the write pole. Thus, the opening defined by sides 38*a*-38*e* uncovers a portion of insulation layer 31, a portion of trench 37, and sidewalls 31*s* adjacent to the uncovered portion of trench 37. The distance along the y-axis direction between point 38*f* and side 38*b* may be from 2 to 20 microns.

Figure 10:
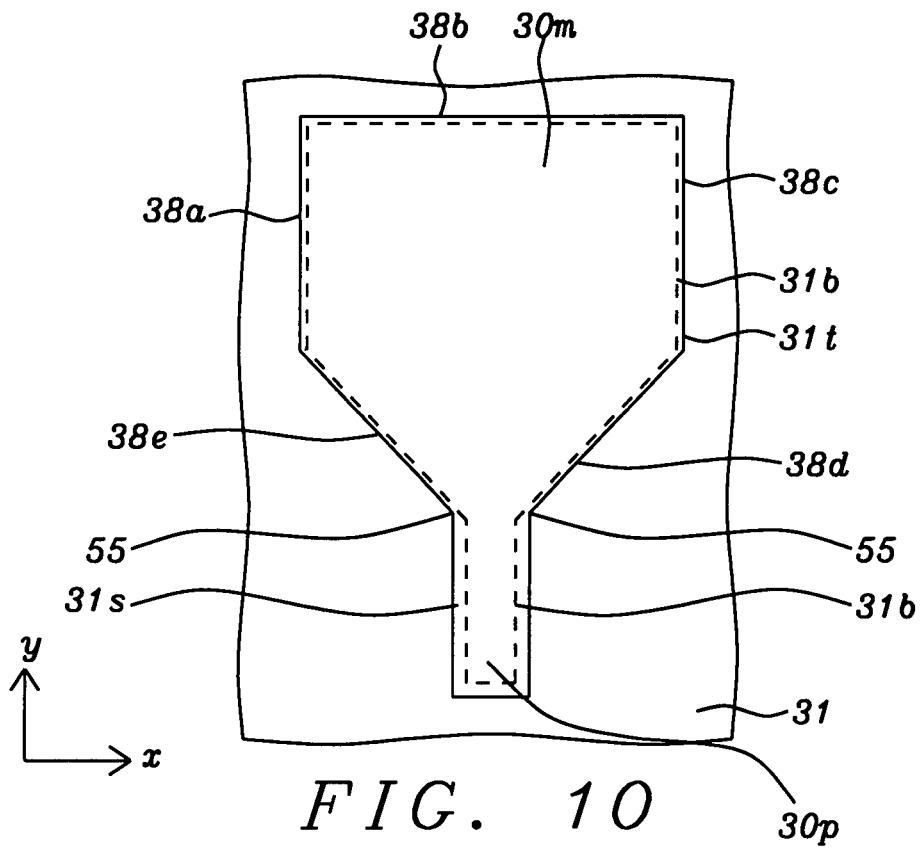
FIG. 10 is a top view of the insulation layer in FIG. 9 after the yoke opening is transferred into the insulation layer and the photoresist layer is removed to leave a mold that will define the shape of a subsequently deposited main pole layer according to an embodiment of the present invention.

Referring to FIG. 10, the yoke opening in second photoresist layer 51 is transferred through the insulation layer 31 and stops on RIE resistant layer 30 by a second RIE process that does not create a beveled sidewall in the insulation layer. For example, the second RIE process may comprise the following conditions: a 0.01 to 0.2 slm flow rate of $BCl_3$, a 0.01 to 0.2 slm flow rate of $Cl_2$, and a RF power of 10 to 200 Watts. During the second RIE process, the uncovered portion of insulation layer 31 within the opening defined by sides 38*a*-38*e* is removed. The second RIE process stops on the RIE resistant layer 30. Although a portion of RIE resistant layer 30 (within the uncovered section of trench 37) is subjected to both the first RIE and second RIE process, the etch resistance of the material selected for RIE resistant layer is sufficiently high so that the resulting surface of RIE resistant layer 30 within the yoke opening is essentially planar. A key feature is that the width of the sidewall 31*s* adjacent to the exposed "yoke" portion 30*m* of the RIE resistant layer 30 is substantially less than the width of sidewall 31*s* adjacent to the exposed "write pole" portion 30*p* from a top view. Thus, the sidewall 31*s* is essentially vertical in the yoke section of the pattern bound by sides 38*a*-38*e* while the sidewall 31*s* is sloped at a BA=α in the narrow section of the pattern that will become the write pole in the main pole layer.

Referring to FIG. 11, the inventors have previously practiced another two mask technique that produces a mold in an insulation layer with a dBA of about zero. Note that the sidewall 31*s* adjacent to the yoke section 30*m* has essentially an equal width to the sidewall 31*s* adjacent to the write pole section 30*p* from a top view. Since the sidewall 31*s* adjacent to the yoke opening still has a significant bevel angle, additional improvement is desirable by minimizing the BA to approximately zero and the sidewall angle to approximately 90°. According to the present invention, a method is disclosed herein that forms a mold within an insulation layer as shown in FIG. 10 which enables a main pole layer to be fabricated with a maximum volume of magnetic material in the yoke adjacent to the neck transition point.

Figure 12:
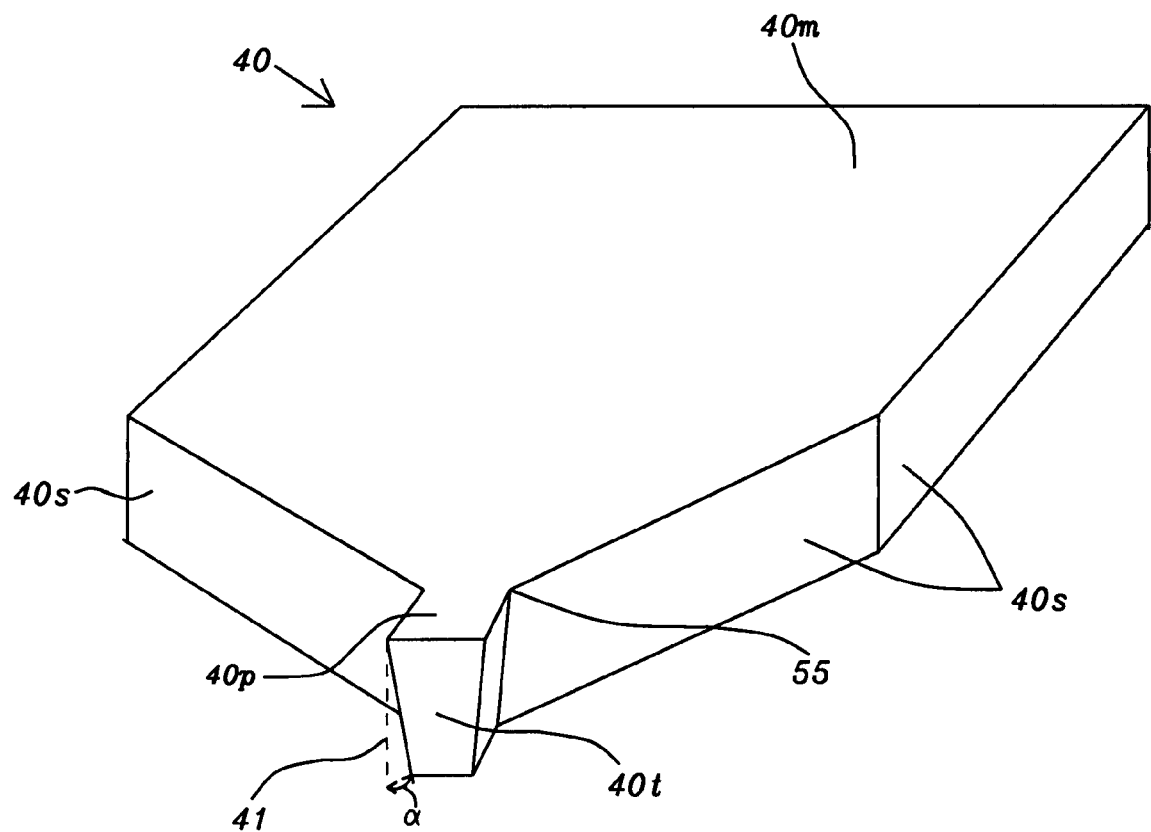
FIG. 12 is an oblique view of a main pole layer (with insulation layer removed) that has been formed by an electroplating method in the mold shown in FIG. 10.

Referring to FIG. 12, a main pole layer (MP) 40 is illustrated with the surrounding insulation layer 31 removed in order to clearly show the sidewalls 40s on the yoke 40m and write pole 40p sections of the MP layer that has been formed by a method of the present invention. In the exemplary embodiment, the MP 40 is formed by first depositing a seed layer on the exposed RIE resistant layer 30 in FIG. 10. Then an electroplating method is employed to deposit a magnetic material that fills the opening within the alumina layer 31. The magnetic material may be comprised of CoNiFe, FeCo, or NiFe that has a high saturation magnetic flux density (Bs) and a plated thickness of about 0.1 to 10 microns. It should be understood that a chemical mechanical polish (CMP) process or an etch technique may be employed to form a planar top surface on MP 40 and remove any magnetic material on the insulation layer 31. Optionally, a non-magnetic layer such as Ta or Ru may be deposited on the insulation layer after the second photoresist is removed and prior to the electroplating step in order to serve as a CMP stop or etch stop during the planarization step following the electroplating process. As stated previously, nearly vertical sidewalls 40s are achieved in the yoke 40m even though the pole 40p has an undercut due to a beveled angle α that is required for optimum performance. An important advantage of the MP 40 over prior art is that the volume of magnetic material in yoke 40m proximate to neck transition points 55 has been maximized by fabricating an essentially vertical sidewall 40s in the yoke.

Figure 4:
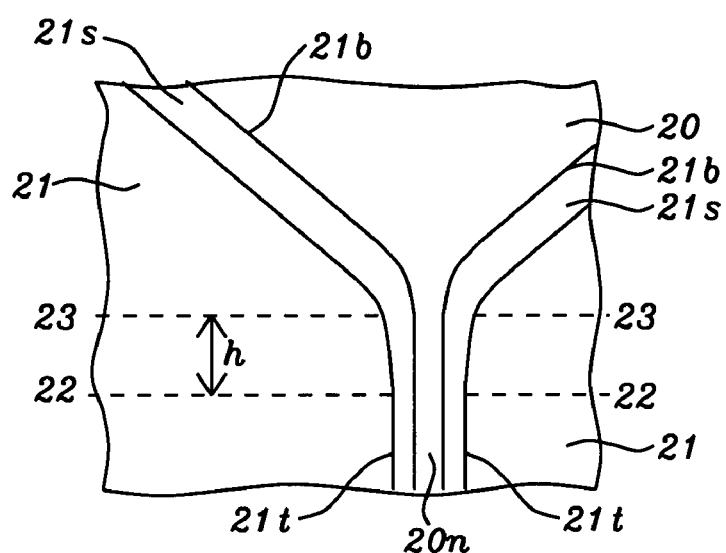
FIG. 4 is a top view of an alumina mold that is formed by a conventional method and has shallower (wider) sidewalls adjacent to the wide opening and steeper (narrower) sidewalls next to the narrow opening.

A second advantage of the MP 40 formed by a method of the present invention is that the neck transition region is substantially reduced in size compared to that in prior art main pole layers. In other words, the junction (neck transition) between the yoke 40m and pole 40p is sharper (less curvature) than previously realized. This feature is accomplished by a negative dBA where the sidewalls of the yoke have a narrower width than the sidewalls of the write pole from a top view. Referring again to FIGS. 4 and 11 where a large positive dBA and essentially zero dBA are depicted, respectively, one observes that the distance between the two planes where the sidewall tops diverge and the sidewall bottoms diverge shrinks dramatically from h in FIG. 4 to a smaller value in FIG. 11 since plane 38-38 and plane 39-39 are closer together than plane 22-22 and plane 23-23 in FIG. 4. Since the neck transition point is better defined in FIG. 11, there is a substantially lower probability that ABS placement errors involving ABS plane 56-56 will cut into the neck transition region and cause a loss of dimension control in track width near the neck. In effect, the reduction of h translates into a sharper transition between write pole and neck. Similarly, another improvement in neck transition sharpness is achieved by further modification from a zero dBA to a negative dBA as described in the present invention. Thus, in a negative dBA mold shape, the two planes (not shown) representing the divergence of sidewall tops and sidewall bottoms, respectively, from a y-axis direction in MP 40 are essentially overlapping at neck transition points 55 (FIG. 8). As a result, dimension control of the main pole and in particular, the track width, is independent of ABS positioning errors that have negatively impacted earlier main pole layer structures.

From a process complexity point of view, the present invention does not require any additional process steps compared with the "two mask" fabrication sequence currently practiced by the inventors. The method described herein can be implemented into the current manufacturing process flow without any additional investment in capital equipment.

While this invention has been particularly shown and described with reference to, the preferred embodiment thereof, it will be understood by those skilled in the art that various changes in form and details may be made without departing from the spirit and scope of this invention.

We claim:

1. A method of preparing a mold shape for depositing a magnetic material therein during the formation of a main pole layer in a perpendicular magnetic recording (PMR) write head, comprising:
   (a) sequentially depositing a reactive ion etch (RIE) resistant layer and an insulation layer on a substrate;
   (b) coating a first photoresist layer on the insulation layer and patterning said first photoresist layer to form a rectangular shaped opening that uncovers a portion of the insulation layer;
   (c) performing a first RIE etch step to transfer said rectangular shaped opening through the insulation layer and stopping on the RIE resistant layer to form a rectangular trench in the insulation layer, said rectangular trench has two long sides aligned in a direction perpendicular to an intended ABS plane, and said rectangular trench has a width that corresponds to a track width in a write pole portion of the main pole layer and has sidewalls with a certain beveled angle such that a top portion of the rectangular trench is larger than a bottom portion of said rectangular trench;
   (d) removing said first photoresist layer;
   (e) coating a second photoresist layer on the insulation layer and patterning said second photoresist layer to form a yoke shaped opening that is partially superimposed over said rectangular trench and uncovers an end of the rectangular trench opposite the intended ABS plane, said yoke shaped opening has a plurality of sides wherein two sides that define a portion of a yoke adjacent to the pole portion converge at a point above said rectangular trench and said point of convergence is positioned between the intended ABS plane and a intended neck transition point where the yoke adjoins a write pole in the main pole layer;
   (f) performing a second RIE step to transfer said yoke shaped opening through the insulation layer and stopping on the RIE resistant layer to form a yoke shaped opening having essentially vertical sidewalls in the insulation layer, said second RIE step removes a portion of the trench opening exposed by the yoke shaped opening such that the yoke shaped opening adjoins the rectangular trench at a neck transition point along each of the two long sides of the rectangular trench; and
   (g) removing the second photoresist layer.

2. The method of claim 1 wherein the RIE resistant layer is made of Ru, NiCr, or NiPd and has a thickness of about 200 to 2000 Angstroms.

3. The method of claim 1 wherein the insulation layer is comprised of alumina or silicon oxide and has essentially the same thickness as desired for the main pole layer.

4. The method of claim 1 wherein the first RIE step comprises $BCl_3$, $Cl_2$, and a fluorocarbon gas.

5. The method of claim 1 wherein said rectangular opening extends a distance of about 0.2 to 10 microns from the intended ABS plane in a direction opposite to said point of convergence and extends a distance of about 0.2 to 10 microns from the point of convergence in a direction opposite the ABS plane.

6. The method of claim 1 wherein the second RIE step comprises $BCl_3$ and $Cl_2$ as etchant gases.

7. The method of claim 1 wherein the sidewalls in the rectangular trench have a slope that is shallower than the slope of the essentially vertical sidewalls in the yoke shaped opening thereby creating a negative differential bevel angle (dBA) configuration for the mold shape in the insulation layer after the second RIE step.

8. A method of forming a main pole layer comprised of a write pole and a yoke in a perpendicular magnetic recording (PMR) write head, comprising:
- (a) sequentially depositing a reactive ion etch (RIE) resistant layer and an insulation layer on a substrate;
- (b) forming a rectangular shaped trench with a top and bottom and two long sides in said insulation layer that uncovers a portion of the RIE resistant layer by means of a first photoresist patterning and etching sequence, said two long sides are aligned in a direction perpendicular to an intended ABS plane, and said rectangular trench has a width corresponding to the track width in the write pole and has sidewalls with a certain beveled angle such that an opening at the top of the rectangular trench is larger than an opening at the bottom portion of said rectangular trench;
- (c) forming a yoke opening with a plurality of sides or a continuous curved side having essentially vertical sidewalls in the insulation layer by a second photoresist patterning and etching sequence which also removes a portion of said rectangular trench including an end opposite the intended ABS plane, said yoke opening uncovers a portion of the RIE resistant layer and adjoins the rectangular shaped trench at a neck transition point along each of the two long sides of said rectangular shaped trench; and
- (d) depositing a seed layer in said rectangular shaped trench and in said yoke opening followed by electroplating a magnetic material on the seed layer to fill said rectangular shaped trench and yoke opening.

9. The method of claim 8 wherein the RIE resistant layer is comprised of Ru, NiCr, or NiPd and has a thickness between about 200 and 2000 Angstroms.

10. The method of claim 8 wherein the insulation layer is comprised of alumina, $SiO_2$, or another dielectric material.

11. The method of claim 8 wherein the first photoresist patterning and etching sequence comprises coating and patterning a first photoresist layer on said insulation layer to form a rectangular shaped opening, transferring said rectangular shaped opening through the insulation layer with a first RIE step that comprises $BCl_3$, $Cl_2$, and a fluorocarbon gas, and then removing said first photoresist layer.

12. The method of claim 8 wherein the second photoresist patterning and etching sequence comprises:
- (a) coating a second photoresist layer on the insulation layer having a rectangular trench therein;
- (b) patterning said second photoresist layer to form a yoke shape opening that is partially superimposed over the rectangular trench wherein two portions of said yoke shape opening that define a section of the yoke proximate to the pole converge at a point above said rectangular trench wherein said point of convergence is positioned between an intended ABS plane and a intended neck transition point where the yoke adjoins the write pole in the main pole layer;
- (c) transferring said yoke shape opening through the insulation layer and stopping on the RIE resistant layer with a second RIE step that comprises $BCl_3$ and $Cl_2$ as etchant gases; and
- (d) removing said second photoresist layer.

13. The method of claim 12 wherein after patterning the second photoresist layer, the rectangular trench extends a distance of about 0.2 to 10 microns from the intended ABS plane in a direction opposite to said point of convergence and extends a distance of about 0.2 to 10 microns from the point of convergence in a direction opposite the ABS plane.

14. The method of claim 8 wherein the sidewalls in the rectangular trench have a slope that is shallower than the slope of the essentially vertical sidewalls in the yoke opening thereby creating a negative differential bevel angle (dBA) configuration in the mold shape within the insulation layer after the second RIE step.

15. The method of claim 8 wherein the rectangular trench has sidewalls with a bevel angle between about 5 and 20 degrees.

* * * * *